United States Patent [19]

Watkins

[11] 4,077,646

[45] Mar. 7, 1978

[54] BICYCLE TRAILER

[76] Inventor: William Andrew Watkins, 402 63rd St., San Diego, Calif. 92114

[21] Appl. No.: 728,755

[22] Filed: Oct. 1, 1976

[51] Int. Cl.² .......................................... B62K 27/06
[52] U.S. Cl. ................................... 280/204; 280/65; 280/511
[58] Field of Search ............... 280/204, 63, 65, 47.26, 280/664, 511

[56] References Cited

U.S. PATENT DOCUMENTS

| 3,271,048 | 9/1966 | Beesley et al. | 280/204 |
| 3,734,536 | 5/1973 | Dever et al. | 280/204 |
| 3,792,875 | 2/1974 | Paden | 280/204 |
| 3,877,723 | 4/1975 | Fahey et al. | 280/204 |
| 3,912,292 | 10/1975 | Lichfield | 280/63 |
| 4,027,899 | 6/1977 | Hawes et al. | 280/204 |

*Primary Examiner*—Joseph F. Peters, Jr.
*Assistant Examiner*—Donn McGiehan
*Attorney, Agent, or Firm*—Brown & Martin

[57] ABSTRACT

A bicycle trailer for towing behind a bicycle includes a box-like chassis having a forward end with a tow bar extending forward therefrom for connecting by a universal adjustable hitch means to the saddle post of a bicycle and includes a pair of independent torsion bars for suspending or supporting wheels independently to either side of the chassis with axles extending into and riding in the slot found on the side of the chassis.

7 Claims, 6 Drawing Figures

U.S. Patent March 7, 1978 4,077,646
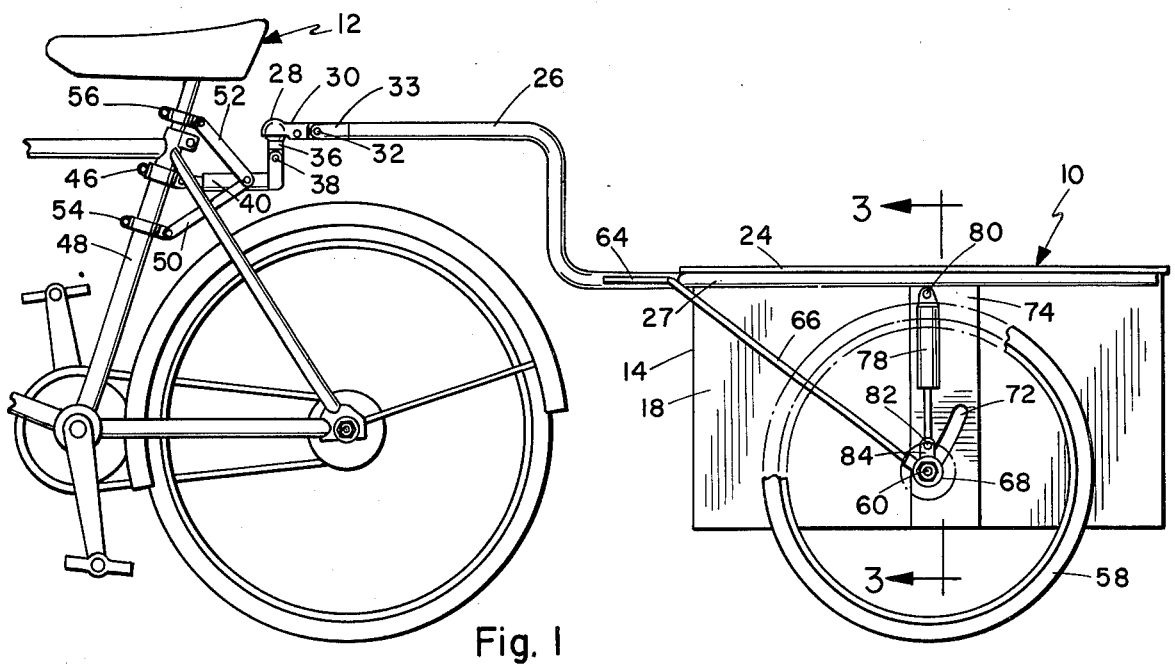
Fig. 1
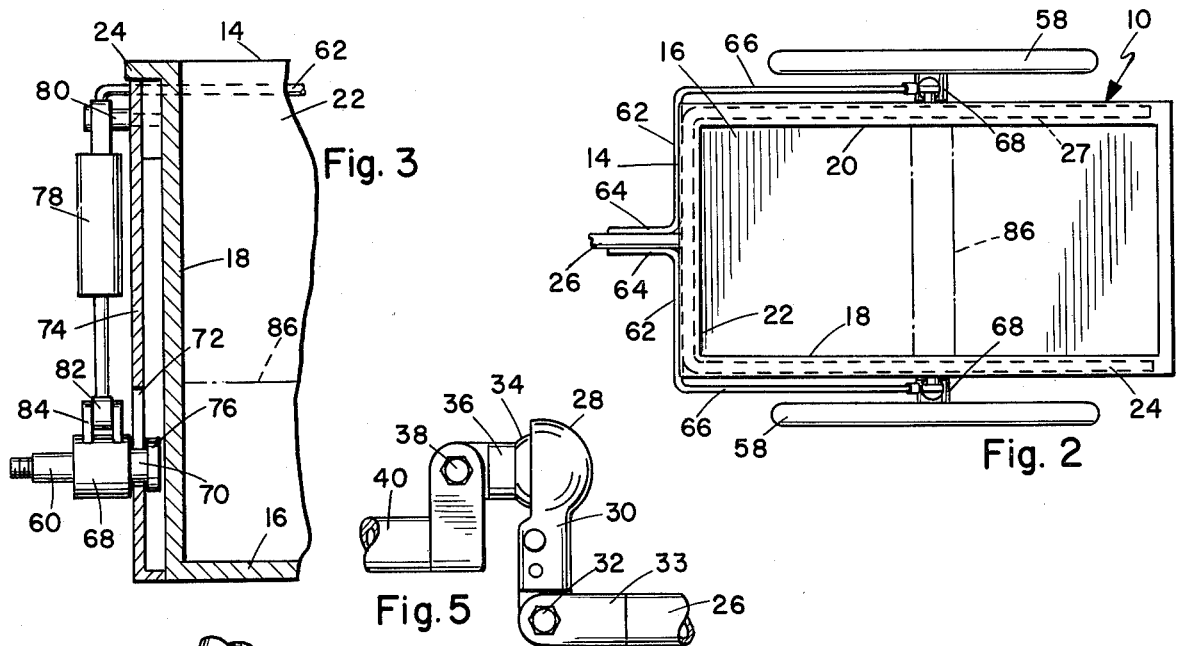
Fig. 3
Fig. 5
Fig. 2
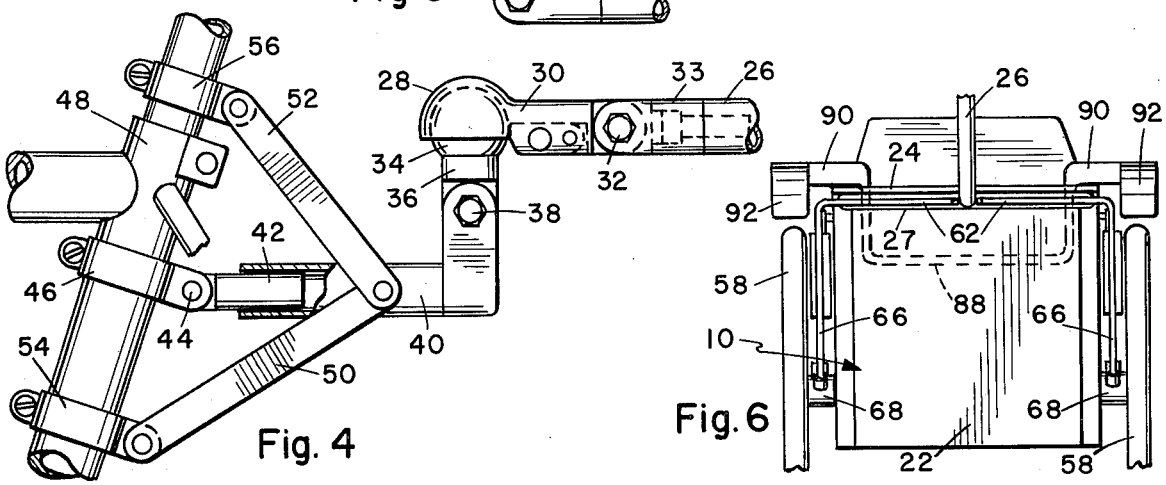
Fig. 4
Fig. 6

BICYCLE TRAILER

BACKGROUND OF THE INVENTION

The present invention relates to trailers and pertains particularly to a trailer for towing behind a bicycle.

Bicycle trailers for towing behind bicycles for carrying cargo and the like have been known for some time. However these prior known bicycle trailers have numerous drawbacks and disadvantages. One of the drawbacks of the prior art trailers is that they have a hard suspension which prevents the hauling of items over rough terrain. Another disadvantage of many of the prior art trailers is that when sufficiently light in weight to be easily towed, they are not sufficiently rugged to withstand much service. Another disadvantage of the prior known trailers is the difficulty of properly adjusting the connection to different size bicycles.

Accordingly it is desirable that there be provided a large capacity bicycle trailer that is built rugged and light in weight and has a reasonably soft suspension.

SUMMARY AND OBJECTS OF THE INVENTION

It is the primary object of the present invention to provide a bicycle trailer that overcomes the above problem of the prior art.

Another object of the invention is to provide a bicycle trailer that has a resilient suspension.

A further object of the present invention is to provide a light weight rugged bicycle trailer that has a fairly large capacity and a reasonably resilient suspension.

In accordance with the primary aspect of the present invention a bicycle trailer is provided with a box-like chassis having a tow bar with universal joint type connecting means for connection to a bicycle and including torsion bar suspension for a pair of wheels mounted to either side of the chassis.

BRIEF DESCRIPTION OF THE DRAWINGS

The above and other objects and advantages of the present invention will become apparent from the following description when read in conjunction with the drawings wherein:

FIG. 1 is a side elevation view of the trailer attached to a bicycle.

FIG. 2 is a top plan view of the trailer.

FIG. 3 is a sectional view taken on line 3—3 of FIG. 1.

FIG. 4 is an enlarged side elevation view of the attachment to the bicycle.

FIG. 5 is a similar view showing the alternate position of the hitch connection portion.

FIG. 6 is a front elevation view of the trailer with a seat and fender unit installed.

DETAILED DESCRIPTION OF A PREFERRED EMBODIMENT

Turning now to the drawings particularly FIG. 1, there is illustrated a bicycle trailer in accordance with the present invention generally designated by the numeral 10 shown connected or hitched to a bicycle generally designated by the numeral 12. The trailer includes a box-like chassis 14 having a bottom 16 with upwardly extending side walls 18 and 20 with a front wall 22 extending upward from the floor or bottom 16 and connected to the sidewalls 18 and 20. A rear wall may be provided integral therewith or may be removable as desired. An upper rim 24 extends around the upper edge of the box-like chassis and may serve as reinforcement for the body structure. A tow bar 26 is secured to the front of the chassis and extends forward on a horizontal for a short distance and then extends upward to a towing hitch. The tow bar also includes a pair of legs that extend around the chassis or body just below the rim 24 for further reinforcing the body. The hitch includes a socket member 28 on one end of an adjustable arm 30 which is adjustably connected by suitable adjustable connecting or pivoting means 32 to the upper forward end of the tow bar 26. This hitch is in turn connected by a swivel joint 33 to the end of tow bar 26. This permits greater relative angular rotation between the trailer and the bicycle. The socket portion of the member 28 receives a ball member 34 which is on the upper end of an arm 36 which is adjustably connected by means of suitable pivotal connection 38 to a horizontally extending hitch or tow bar 40.

The hitch or tow bar 40 comprises a two piece telescoping section including an inner bar 42 pivotally connected at 44 to a clamp 46 which encircles and clamps to the saddle post 48 of the bicycle 12. A pair of adjustment and alignment braces 50 and 52 are each connected by suitable clamp means 54 and 56 respectively above and below the clamp 46 for adjusting and aligning the tow bar member 40. As best seen in FIG. 5 the adjustable hitch arrangement can be adjusted such that the arm 36 is horizontal and the arm 30 is vertical as shown. This arrangement permits greater latitude in leaning the bicycle and also permits the lowering of the tow bar 26 without adjusting the braces 50 and 52.

The trailer is supported by means of a pair of wheels which are preferably conventional bicycle wheels 58 rotatably mounted on a pair of axles 60 on opposite sides of the trailer chassis. The axles 60 are each independently supported by a generally "z" shaped torsion bar having a central torsion member 62 a first or stationary anchoring arm 64 extending outward from one end of the torsion member and secured in an horizontal manner along the horizontally extending portion of the tow bar 26. A second or movable arm 66 is secured to the opposite end of the torsion member 62 and extends downward at an angle of approximately 45° and is secured at its lower end to a suitable axle support or bearing member 68 for supporting the axle 60.

The outer end of the axles 60 support the wheel as shown and the inner of the axles on the opposite side of the bearing or support member 68 include a rotor 70 which rides in an arcuate slot 72 formed in a box-like section 74 secured to the side of the body or chassis. The inner end of the rotor or bearing 70 includes an enlarged head or disc like member 76 having diameter exceeding the width of the slot 72 for retaining the axle assembly therein. A pair of generally conventional type shock absorbers 78 are pivotally connected at the upper end to the chassis body at a pivot 80 and at the lower end at 82 to a suitable bracket 84 on the bearing or support member 68.

The trailer chassis is constructed of a suitable light weight material such as fiber glass, plastic, light weight sheet metal, or other suitable materials. Reinforcing may be required where particularly sheet material is used. For example, in an alternate construction, a box-like reinforcing step may be extended across the bed of the chassis at 86 between the two sides of the bed providing a box-like reinforcing section, as indicated in broken line in FIGS. 2 and 3. It may be also desirable to connect the axles together on a single axle for strength purposes rather than have independently spring as shown. The box-like section 86 provides a convenient enclosure for such axle to permit free movement without interference with articles or the like contained within the bed.

A detachable seat may also be provided for permitting a person to ride in the trailer, as in FIG. 6. The seat includes a central seat portion 88 having end brackets 90 for engaging the upper rail 24 of the bed for supporting the seat on the bed. A pair of fenders 92 are provided for positioning over the wheels for preventing mud, water and the like from being thrown into the trailer while in motion.

While the trailer is illustrated and described as being a bicycle trailer it is to be understood that it is not to be so limited. The trailer may be towed behind any manually powered vehicle including but not limited to bicycles, tricycles and even wheelchairs. It may also be towed behind motorcycles.

While the present invention has been described and illustrated by means of a specific embodiment it is to be understood that numerous changes and modifications may be made therein without departing from the spirit and scope of the invention as defined in the appended claims.

Having described my invention, I now claim.

1. A trailer adapted to be towed by a bicycle comprising:
    a box-like body chassis having a slot in each side thereof, a forward end, and a tow bar secured to and extending forward from said forward end;
    a pair of axles slidably mounted in said slots, torsion bar suspension means connected to said tow bar and to said axles for supporting said pair of axles, one on each side of said body chassis;
    a wheel rotatably mounted on each axle for supporting said body for translation along the ground; and
    universal hitch means for connecting said tow bar to a bicycle and including a ball and socket coupling means for permitting said bicycle to lean from the vertical with respect to said trailer.

2. The trailer according to claim 1 wherein said suspension means include a shock absorber for each wheel.

3. The trailer of claim 2 wherein said torsion bar suspension means includes a pair of torsion bars each having a central torsion member and a first arm extending from one end thereof parallel to and secured to said tow bar, and a second arm extending from the other end thereof for supporting said axles.

4. The trailer of claim 3 wherein said central torsion member of said torsion bars each extend horizontally in opposite directions along the front of said chassis.

5. The trailer of claim 4 wherein said second arm of each of said torsion bars extend downward at a substantially 45° angle to the horizontal.

6. The trailer of claim 5 wherein said hitch means includes a support member having clamping means on one end thereof for securing to the saddle post of a bicycle and a ball member on the opposite end, thereof; and
    a socket member on the forward end of said tow bar for receiving said ball member and locking means for locking said ball means in said socket member.

7. The trailer of claim 6 wherein said ball member is mounted on a selectively pivotal arm on said support member and said socket member is mounted on a selectively pivotal arm on said tow bar member.

* * * * *